United States Patent
McMahon

(10) Patent No.: US 11,448,323 B2
(45) Date of Patent: Sep. 20, 2022

(54) ROTARY VALVE WITH CONTROL ELEMENT

(71) Applicant: FISHER CONTROLS INTERNATIONAL LLC, Marshalltown, IA (US)

(72) Inventor: Timothy A. McMahon, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 15/967,339

(22) Filed: Apr. 30, 2018

(65) Prior Publication Data

US 2019/0331229 A1  Oct. 31, 2019

(51) Int. Cl.
*F16K 1/22* (2006.01)
*F16K 1/52* (2006.01)

(52) U.S. Cl.
CPC ............... *F16K 1/22* (2013.01); *F16K 1/222* (2013.01); *F16K 1/52* (2013.01)

(58) Field of Classification Search
CPC ... F16K 1/22; F16K 1/52; F16K 1/222; F16K 1/54; F16K 1/18
USPC .......................................................... 251/305
See application file for complete search history.

(56) References Cited

U.S. PATENT DOCUMENTS

| | | | |
|---|---|---|---|
| 6,726,176 B2 | 4/2004 | Bauman | |
| 6,793,197 B2 | 9/2004 | DePenning et al. | |
| 7,416,164 B2 | 8/2008 | Eggleston et al. | |
| 2014/0203201 A1 | 7/2014 | Kinser | |
| 2015/0345661 A1* | 12/2015 | Herold | F16K 47/045 251/118 |
| 2017/0102089 A1 | 4/2017 | Griffin, Jr. et al. | |
| 2017/0356273 A1 | 12/2017 | Bayh, III et al. | |

(Continued)

FOREIGN PATENT DOCUMENTS

| | | |
|---|---|---|
| CN | 104197031 B | 7/2016 |
| DE | 4446395 A1 | 6/1996 |

(Continued)

OTHER PUBLICATIONS

Translation of DE 102014102290 (Year: 2020).*

(Continued)

*Primary Examiner* — Kelsey E Cary
(74) *Attorney, Agent, or Firm* — Marshall, Gerstein & Borun LLP

(57) ABSTRACT

A rotary valve includes a valve body defining an inlet, an outlet, and a fluid flow path connecting the inlet and the outlet, and a valve shaft is disposed in the valve body. A control element includes a first side, a second side, and defines a pivot axis. The control element operatively connected to the valve shaft, disposed in the fluid flow path, and is rotatable by the valve shaft about the pivot axis between an open position, in which the control element permits fluid flow between the inlet and the outlet, and a closed position, in which the control element limits flow between the inlet and the outlet of the valve body. A portion of the control element includes a lattice structure including a plurality of connected lattice members. The lattice structure defines one or more channels extending across the first side of the control element.

17 Claims, 11 Drawing Sheets

(56) References Cited

U.S. PATENT DOCUMENTS

2018/0056101 A1 3/2018 Cockerham et al.
2018/0112800 A1 4/2018 Griffin, Jr. et al.

FOREIGN PATENT DOCUMENTS

DE   102014102290 A1   4/2015
FR        1029746 A    6/1953
FR        1423231 A    1/1966
GB        1104759 A    2/1968
RU        2419014 C2   5/2011

OTHER PUBLICATIONS

International Search Report and Written Opinion for PCT/US2019/029745, dated Jul. 3, 2019.
Fisher Controls International LLC., Fisher™ 8590 Rotary Valve, Instruction Manual (Feb. 2018).
Fisher Controls International LLC., Fisher™ 8560 High-Performance Butterfly Control Valve, Product Bulletin (Aug. 2017).
Fisher Controls International LLC., Fisher™ 8580 Rotary Valve, Product Bulletin (Sep. 2016).
Fisher Controls International LLC., Fisher™ 8590 High-Performance Butterfly Valve, Product Bulletin (Aug. 2017).

\* cited by examiner

A-A

D-D

E-E

ROTARY VALVE WITH CONTROL ELEMENT

FIELD OF DISCLOSURE

The present disclosure generally relates to a rotary valve, and, more particularly, to a control element and a method of manufacturing a control element for a rotary valve.

BACKGROUND

Control valves are commonly used in industrial processes, such as oil and gas pipeline distribution systems and chemical processing plants, to control the flow of process fluids. In some industrial processes, rotary valves, such as ball valves and butterfly valves, are the preferred control valve because they provide a higher flow capacity and tight shut-off and may be more cost effective to manufacture. However, conventional manufacturing processes and techniques for manufacturing components of control valves may place design and material restrictions on the valve components, such as valve disks. When using casting, forging, and other suitable methods to manufacture a valve component, a designer may be required to weigh benefits of complexity against the costs associated with manufacturing a complex component. Additional costs related to manufacturing rotary valve disks may include costs associated with labor and equipment needed to lift and assemble rotary valves.

SUMMARY

In accordance with a first exemplary aspect, a rotary valve may include a valve body defining an inlet, an outlet, a fluid flow path connecting the inlet and the outlet, and a valve shaft disposed in the valve body. A control element may include a first side and a second side, and may define a pivot axis. The control element may be operatively connected to the valve shaft and may be disposed in the fluid flow path. The control element may be rotatable by the valve shaft about the pivot axis between an open position, in which the control element permits fluid flow between the inlet and the outlet, and a closed position, in which the control element limits flow between the inlet from the outlet. A portion of the control element may include a lattice structure including a plurality of connected lattice members. The lattice structure may define one or more channels extending across the first side of the control element.

In accordance with a second exemplary aspect, a control element for controlling fluid flow through a rotary valve may include a body having a first side, a second side opposite the first side, and a pivot axis. A lattice structure may include a plurality of lattice members and may define one or more channels extending across the body at an angle relative to the pivot axis of the body. The lattice structure may be disposed on at least one of the first side and the second side of the body.

In accordance with a third exemplary aspect, a method of manufacturing a control element of a rotary valve using additive manufacturing may include forming a base having a first surface and a second surface opposite the first surface. The method may further include forming a three-dimensional lattice structure by depositing solidifiable material onto the base, wherein forming the lattice structure may include forming a plurality of lattice members and arranging the lattice members to define one or more channels extending across the base.

In further accordance with any one or more of the foregoing first, second, or third aspects, a rotary valve, control element, and/or method may further include any one or more of the following preferred forms.

In a preferred form, the one or more channels of the control element may define a secondary flow path connecting the inlet and the outlet when the control element is in the open position.

In a preferred form, the lattice structure may include one or more lattice cell units. One lattice cell unit may include a central cavity that may at least partially define one channel of the one or more channels.

In a preferred form, one lattice cell unit of the one or more lattice cell units may have a polygonal cross-sectional shape.

In a preferred form, the one or more lattice cell units may at least partially extend across the first side of the control element in a direction perpendicular to the pivot axis of the control element.

In a preferred form, the first side may be one of a downstream side and an upstream side of the control element.

In a preferred form, the rotary valve may include one or more channels extending across the second side of the control element.

In a preferred form, the rotary valve may include a lattice brace connecting a first lattice cell unit to a second lattice cell unit of the one or more lattice cell units. The lattice brace may enclose a portion of the lattice structure.

In a preferred form, the control element may include a base connecting the first side and the second side.

In a preferred form, the lattice structure may be integrally formed with the base of the control element.

In a preferred form, the lattice structure may be attachable a surface of the base of the control element.

In a preferred form, the lattice structure may include a plurality of lattice cell units. One lattice cell unit may include a central cavity at least partially defining one channel of the one or more channels.

In a preferred form, at least one of the plurality of lattice cell units may have a cross-section defined by at least two lattice members of the plurality of lattice members. The at least two lattice members may be connected to form the cross-section.

In a preferred form, the body may include a first portion of a first density and a second portion of a second density. The first density may be greater than the second density.

In a preferred form, the control element may include a brace joining at least two lattice cell units of the plurality of lattice cell units. The brace may at least partially define one channel of the one or more channels.

In a preferred form, the control element may include an inlet edge and an outlet edge symmetrically disposed about the pivot axis. The one or more channels may extend between the inlet edge and the outlet edge.

In a preferred form of the method, depositing the solidifiable material may include depositing the solidifiable material directly onto at least one of the first surface and the second surface of the base.

In a preferred form of the method, forming the base may include forming the base and the three-dimensional lattice structure together by depositing a solidifiable material in multiple layers to create a three-dimensional control element body.

In a preferred form of the method, forming the three-dimensional lattice structure may include connecting the plurality of lattice members to form one or more lattice cell units. Connecting the plurality of lattice members may include arranging at least two of the plurality of lattice members to form a polygonal cross-sectional shape of at least one of the lattice cell units.

DETAILED DESCRIPTION

The present disclosure is generally directed to a rotary valve having a control element and a method of manufacturing the control element to increase flow capacity and reduce overall weight of the rotary valve. The rotary valve and control element of the examples described and illustrated herein may be manufactured by one or more techniques of Additive Manufacturing (AM).

Figure 1:
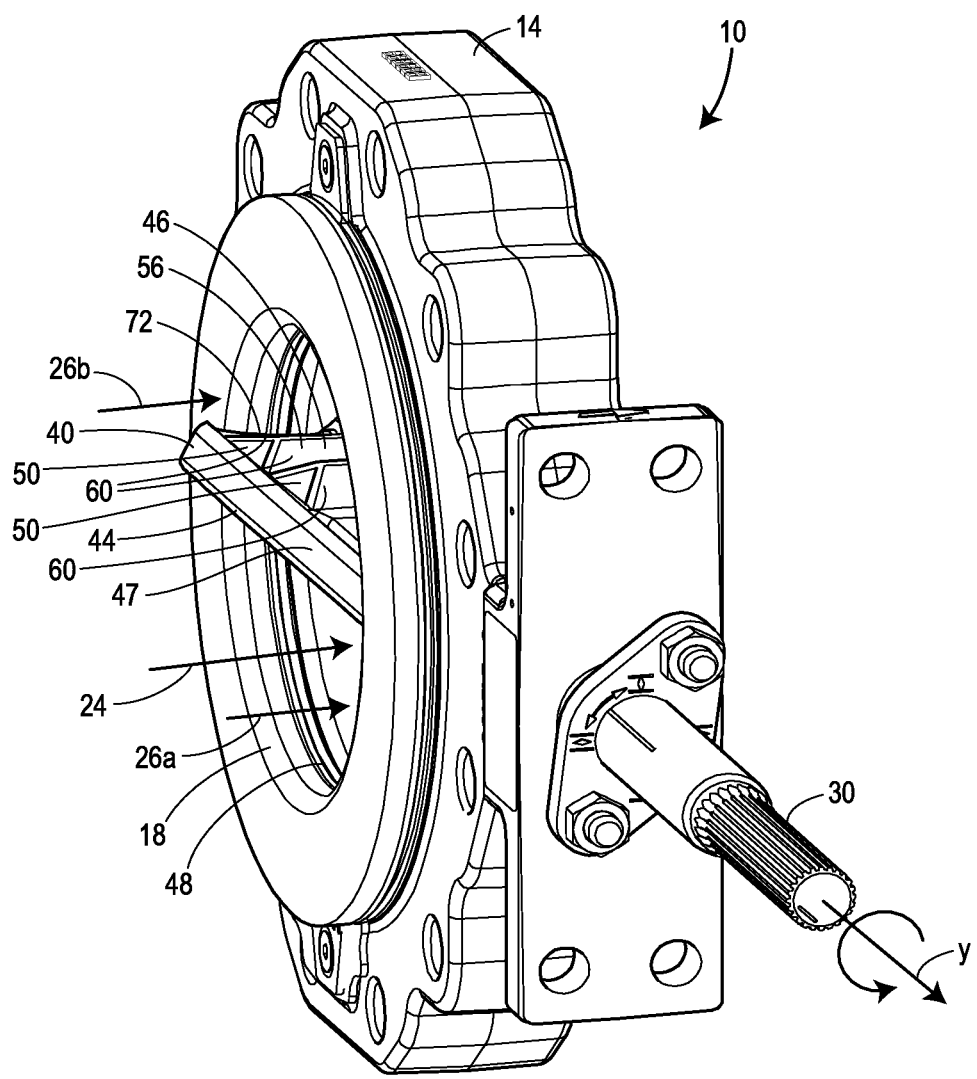
FIG. 1 is a perspective view of a rotary valve having a control element assembled in accordance with the teachings of a first exemplary arrangement of the present disclosure and showing the control element in a partially open position.
Figure 2:
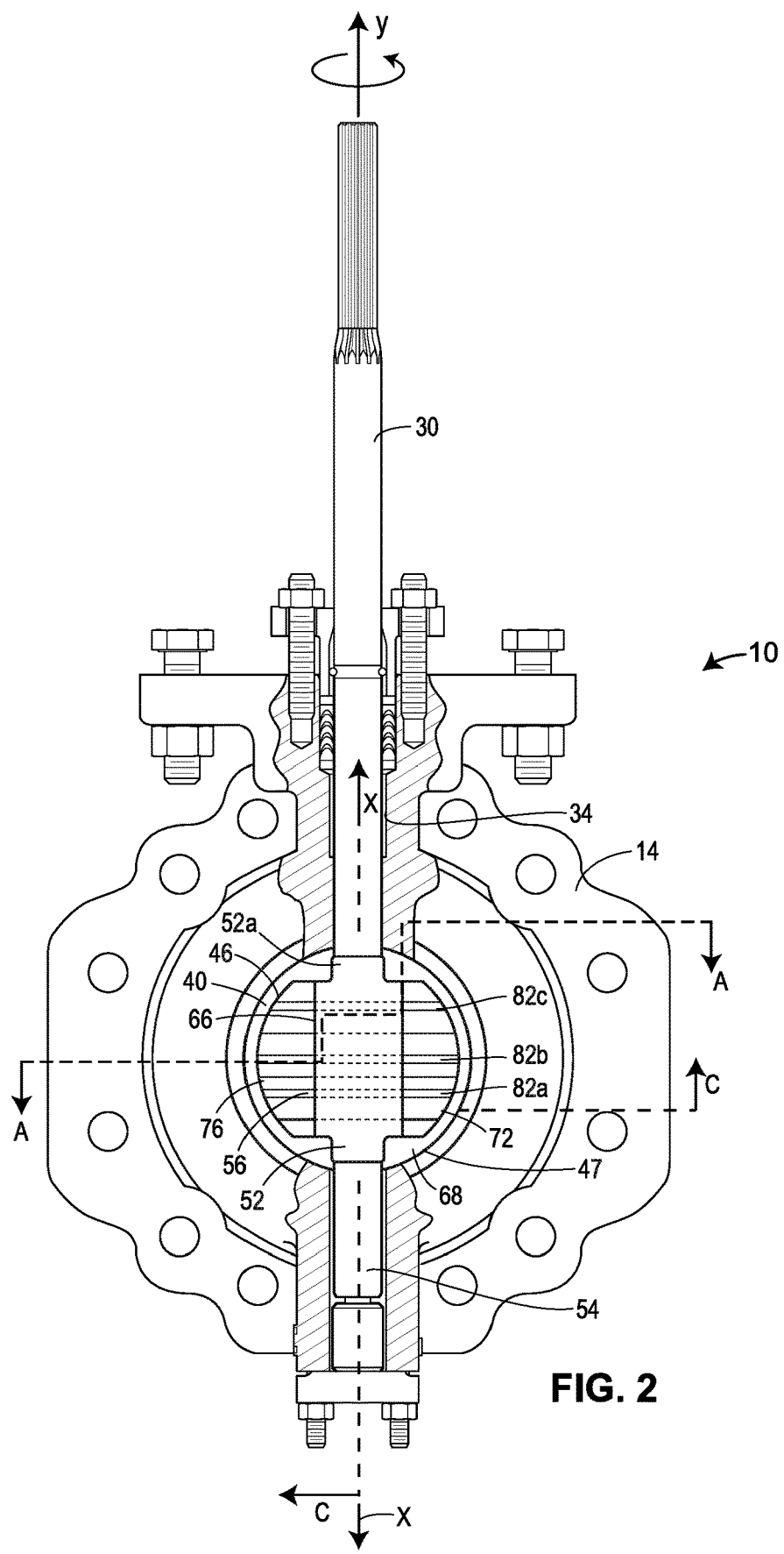
FIG. 2 is a rear elevational and partial cut-away view of the valve of FIG. 1 and showing the control element in a closed position.

In FIGS. 1 and 2, the first exemplary rotary valve 10 is a butterfly valve and is constructed according to the teachings of the present disclosure. The rotary valve 10 includes a valve body 14 defining an inlet 18, an outlet 22, and a fluid flow path 24, which includes first and second flow paths 26a, 26b, connecting the inlet 18 and the outlet 22 when the valve 10 is open, or at least partially open. A valve shaft or stem 30 is disposed through a bore 34 formed in the valve body 14, and is rotatable to control the opening and closing of the valve 10 by rotating a control element 40. The control element 40 includes a base 42, an upstream or front side 44, and a downstream or back side 46. The control element 40 is operatively connected to the valve shaft 30, is disposed in the fluid flow path 24, and controls fluid flow through the valve body 14. The control element 40 is rotatable by the valve shaft 30 about a pivot axis X of the control element 40 between an open position (a partially open position shown in FIG. 1), in which the control element 40 permits fluid flow between the inlet 18 and the outlet 22, and a closed position shown in FIG. 2, in which the control element 40 limits flow between the inlet 18 from the outlet 22 of the valve body 14. When the valve 10 is closed, an outer edge 47 or circumference of the control element 40 sealingly engages with an annular seal ring 48 disposed within the valve body 14. When the control element 40 is open, the first fluid flow path 26a is defined between the front side 44 of the control element 40 and the valve body 14, and the second fluid flow path 26b is defined between the back side 46 of the control element 40 and the valve body 14. Further, the second flow path 26b control element 40 includes one or more channels 50 formed through a portion of the control element 40 to provide additional flow paths, thus increasing the flow capacity of the control element 40. The control element 40 may have any shape and/or configuration to prevent fluid from flowing through the inlet 18 when the control element 40 is in the closed position, and to allow fluid flow through the inlet 18 when the control element 40 is in the open position or partially open position. In the illustrated examples of FIGS. 1 and 2, the control element 40 is a valve disk, however, in another example, the control element 40 may be a ball closure member. In yet another example, the control valve 40 may restrict or limit fluid flow through the inlet 18 when the valve 10 is in the closed position, but may permit some fluid to flow through. In this example, the valve 10 does not have a seal.

The base 42 may be a non-porous, wafer or disk and includes first and second hubs 52a, 52b that serve to rotatably mount the control element 40 within the valve body 14. The first hub 52a includes a bore 53a to receive the valve shaft 30, and the second hub 52b includes a bore 53b to receive a follower shaft 54 at an opposite edge of the control element 40. The valve shaft 30 is secured to the first hub 52a of the control element 40 so that the control element 40 rotates (i.e. pivots) about the pivot axis X when the valve shaft 30 rotates or twists about a longitudinal axis Y of the valve shaft 30. At an opposite end, the valve shaft 30 may be coupled to an actuator shaft of an actuator (not illustrated), which controls the movement of the valve shaft 30. The follower shaft 54 is aligned with the longitudinal axis Y of the first valve shaft 30, and is operatively coupled to the control element 40 to ensure proper alignment of the control element 40 as the control element 40 pivots about the X axis. The pivot axis X may be aligned with the longitudinal axis Y of the valve shaft 30, or the pivot axis X may be offset from the longitudinal axis Y. In one example, the valve shaft 30 may be a unitary shaft that extends through the entire diameter of the control element 40 and through both bores 53a, 53b formed in the first hub 52a and the second hub 52b, respectively, to rotatably mount the control element 40 within the valve 10.

The rotary valve 10 of FIGS. 1 and 2 permits fluid to flow through the first fluid flow path 26a across the back side 46 of the control element 40 and the second fluid flow path 26b across the front side 44 of the control element 40 when the control element 40 is in an open position. A lattice structure 56 includes, and is defined by, a plurality of connected lattice members 60 that form a plurality of spaces within the lattice structure 56. As such, the first density of the base 42 is greater than the second density of the lattice structure 56. The lattice structure 56 may provide an increased flow capacity and a reduced weight without compromising the integrity of the control element 40.

As shown in FIG. 1, the control element 40 is in a partially open position between a fully open position (not illustrated), in which the base 42 of the control element 40 is parallel or generally parallel to the flow path 24, and a fully closed position, in which the base 42 is perpendicular or generally perpendicular to the flow path 24, and as shown in FIG. 2. When the valve 10 is open, fluid may flow from the inlet 18 to the outlet 22 by flowing around the front side 44 via the first flow path 26a, around the back side 46 via the second flow path 26b, and through primary, secondary, and tertiary channels 50, 62, 64 formed in the back side 46 of the control element 40 (see channels 62, 64 in FIGS. 4-6). Accordingly, the primary, secondary, and tertiary channels 50, 62, 64 of the lattice structure 56 thus alter flow capacity of the rotary valve 10. As used herein, the term "lattice structure" may refer to a three-dimensional arrangement or array of connected structural elements (i.e. lattice members 60 or lattice cell units) that may be arranged diagonally, horizontally, and vertically to form a plurality of triangular, diamond, round, rectangular or other polygonal shape openings in a pattern. The openings may together or separately form the plurality of channels 50, 62, 64 of the lattice structure 56 (see channels 62, 64 in FIGS. 4-6). The plurality of lattice members may be separate elements, or the lattice members may be joined together (or formed together) to make an integral structure having a lattice pattern.

The lattice structure 56 of the control element 40 is customizable to a process or application in which the control element 40 is used. Rather than being limited in design due to the limitations of conventional manufacturing processes, the control element 40 of the present disclosure may be constructed specifically to meet certain process system requirements and achieve a desired valve performance. As will be described in more detail below, the lattice structure 56 may be formed using additive manufacturing (AM) techniques, allowing customization of the control element 40. AM techniques enable the lattice structure 56 to be formed together with the base 42 or separately and then later attached (e.g. welding) to a downstream surface 66 of the base 42. In addition to customizing the back side 46 of the control element 40, the front side 44 of the control element 40 may be configured to provide additional advantages or functionalities, as well. In another example, the front side 44 may include a lattice structure to affect (e.g. enhance, characterize) fluid flow and/or improve dynamic torque of the valve 10. It will be appreciated that the control element 40 may include a lattice structure 56 connected (e.g. integrally formed or attached) to both the upstream surface 70 and the downstream surface 66 of the base 42.

Figure 3:
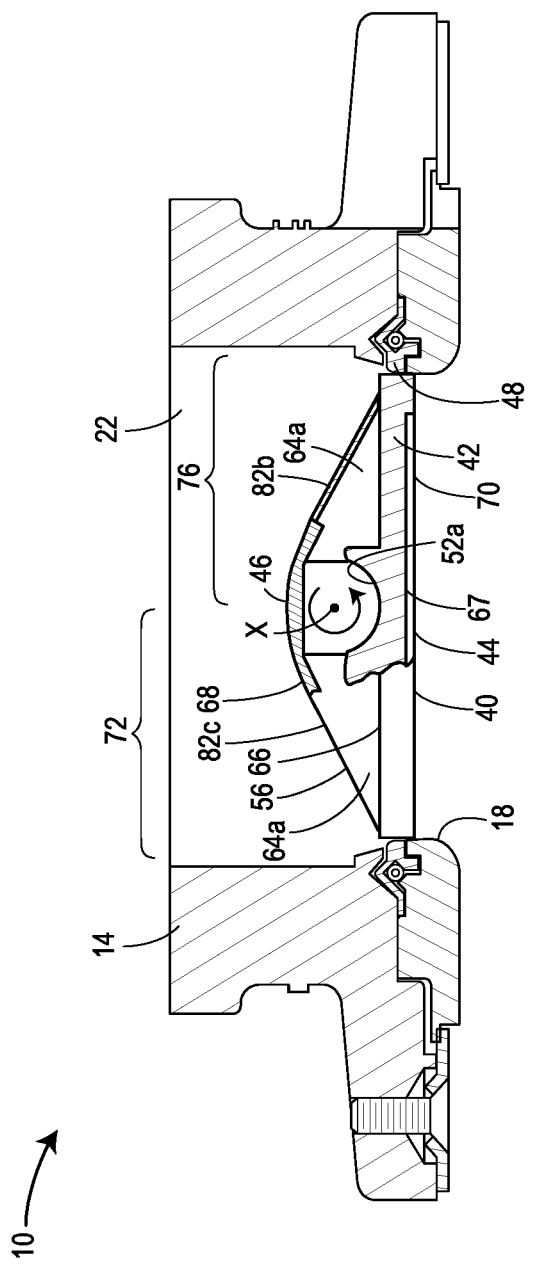
FIG. 3 is a cross-sectional side view of the valve of FIG. 1 taken at A-A of FIG. 2.
Figure 4:
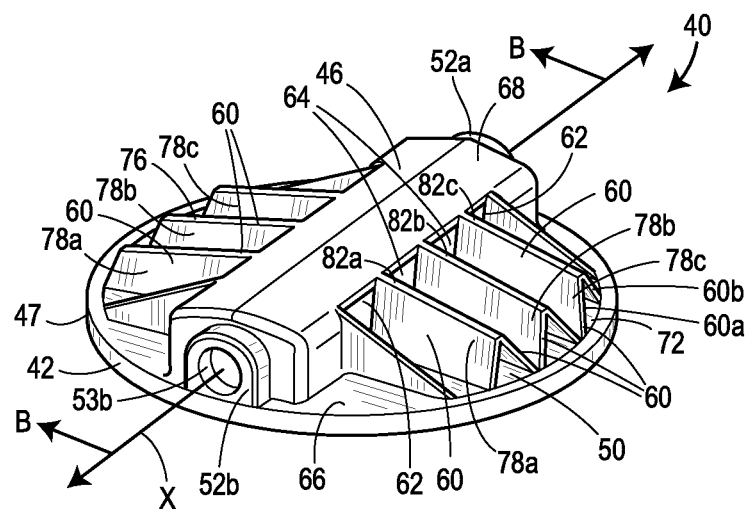
FIG. 4 is a rear, perspective view of the control element of FIG. 1.

As shown in FIGS. 2-4, the lattice structure 56 is composed of a plurality of interior lattice members 60a, exterior lattice members 60b, and a lattice brace 68. The brace 68 extends across the back side 46 of the control element 40 between the first and second hubs 52a, 52b. The lattice structure 56 is partially encapsulated by the brace 68 through a central portion of the control element 40, and is partially open (i.e. free-standing) immediately adjacent to the brace 68 at both a leading portion 72 and a trailing portion 76 of the control element 40. The leading portion 72 and the trailing portion 76 refer to separate areas of the control element 40 that are exposed fluid flow. As the valve shaft 30 rotates between 0 and 90 degrees about the Y axis, the leading portion 72 of the control element 40 moves toward the inlet 18 and away from the outlet 22 of the valve 10. At the same time, the trailing portion 76 moves into the outlet 22 of the valve 10 and away from the inlet 18 and seal ring 48. As such, fluid flows across a leading edge of the leading portion 72 of the control element 40 before flowing across a trailing edge of the trailing portion 76 of the control element 40.

Figure 5:
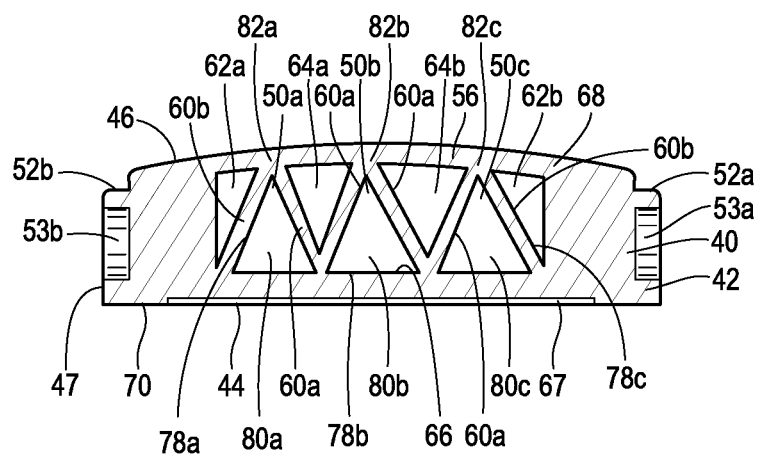
FIG. 5 is a cross-sectional side view of the control element of FIG. 1 taken at B-B of FIG. 4.
Figure 6:
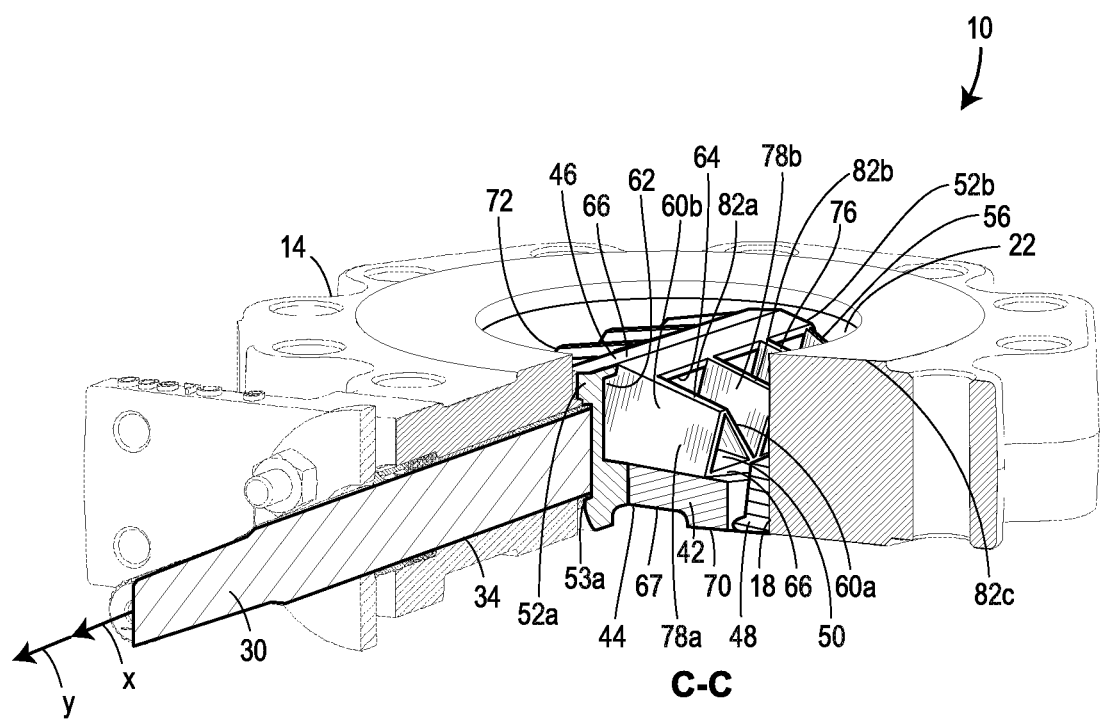
FIG. 6 is a partial, cross-sectional view of the valve of FIG. 1 taken at C-C of FIG. 2.

Turning now to FIGS. 4-6, the lattice structure 56 of the control element 40 is shown in more detail. The interior and exterior lattice members 60a, 60b may form a plurality of connected lattice cell units 78a, 78b, 78c that may repeat in a pattern to provide the overall lattice structure 56. For example, the lattice structure 56 includes three lattice cell units 78a, 78b, 78c, and each lattice cell unit 78a, 78b, 78c has a central cavity 80a, 80b, 80c and a triangular cross-section that is perpendicular to the pivot axis X of the control element 40. Each lattice cell unit 78a, 78b, 78c may be a sloped triangular column defined by at least two lattice members 60 connected to the downstream surface 66 of the base 42 in a three-dimensional space. A joint 82a, 82b, 82c of each lattice cell unit 78a, 78b, 78c is a continuous lattice member 60 that slopes toward the brace 68 as the lattice cell unit 78a, 78b, 78c extends inwardly relative to the pivot axis X. However, in other examples, the joint 82a, 82b, 82c of the lattice cell unit 78a, 78b, 78c may instead follow a curved slope, may not slope at all, and/or may be discontinuous across the control element 40. It will be appreciated that the lattice structure 56 may be designed to provide any number of different configurations with varying lattice complexity.

In the illustrated example, the channels 50, 62, 64 extend across the control element 40 at an angle relative to the pivot axis X. In particular, the primary, secondary, and tertiary channels 50, 62, 64 extend perpendicularly relative to the pivot axis X. However, in other examples, the channels 50, 62, 64 may be oriented relative to the pivot axis X at a different angle to achieve a different flow profile or characteristic. For example, in some cases, primary channels 50a, 50b, 50c of FIG. 5 perpendicular, or substantially perpendicular, to the pivot axis X of the control element 40, or the channels 50a, 50b, 50c may be oriented at an angle in a range between 0 and 90 degrees relative to the pivot axis X. In another example, the lattice structure 56 may be formed such that the channels 50a, 50b, 50c are oriented at different angles.

The lattice cell units 78a, 78b, 78c define primary channels 50a, 50b, 50c that extend across the back side 46 of the control element 40. As shown in FIG. 5, the brace 68 connects the first and second hubs 52a, 52b of the control element 40 with the exterior lattice members 60b. As such, the brace 68 at least partially defines secondary channels 62a, 62b disposed between the exterior lattice members 60b and the first and second hubs 52a, 52b. The brace 68 also connects each of the triangular lattice cell units 78a, 78b, 78c with the adjacent lattice cell unit 78a, 78b, 78c to form tertiary channels 64a, 64b. For example, the brace 68 connects first and second cell units 78a, 78b to form channel 64a, and the brace 68 connects second and third cell units 78b, 78c to form channel 64b. The brace 68 may be a single lattice member 60, or the brace 68 may be composed of a plurality of connected lattice members 60. In this example, the brace 68 slopes between the first hub 52a and the second hub 52b, however, in other examples, the brace 68 may have a different shape or contour and may be configured to partially extend between the first and second hubs 52a, 52b. In one example, the brace 68 may form the secondary channels 62a, 62b without connecting the lattice cell units 78a, 78b, 78c to form the tertiary channels 64a, 64b. In other examples, the lattice structure 56 may include more or fewer connected lattice members 60 and/or lattice cell units 78a, 78b, 78c than the example control element 40 of FIGS. 1-6.

By virtue of being customizable, the lattice structure 56 may have any number of different configurations where each configuration may be suited according to the requirements of the process for which the control element 40 is used. In a high pressure application, fluid reaction forces generate areas of high and low pressure on the front side 44 of the control element 40. For this application, a control element 40 may be customized to provide a lattice structure 56 formed in one or both of the front side 44 and the back side 46 of the control element 40 to improve the performance of the control element 40 in a high pressure environment. The lattice cell members 60 may have uniform or varying thicknesses and lengths, and may be connected at uniform or varying distances and angles relative to one another. The lattice cell members 60 may be joined with a radius or fillet, in which the radius may reduce stress between connected lattice cell members 60 of the lattice structure 56. The geometry of the lattice cell units 78a, 78b, 78c may vary in shape and size to provide a desirable disk rigidity, strength, and lattice density (i.e. the amount of open space or cavities in the lattice structure) across the control element 40. The lattice structure 56 may be constructed with a non-uniform lattice density (e.g. a lattice gradient), so that, for example, certain areas of the control element 40 that are subject to higher fluid forces may have a higher density than other areas of the control element 40 that are not subject to the same fluid forces. In some examples, the lattice structure 56 may be contoured to help balance fluid forces imparted on the control element 40 and reduce valve shaft torque. Accordingly, the design of the lattice structure 56 may be adjusted and customized to achieve desirable valve performance characteristics.

Turning now to FIG. 6, the lattice structure 56 of the trailing portion 76 of the control element 40 is shown. FIG. 6 is partial cut-out of a cross-section C-C taken at two intersecting orthogonal planes disposed through the rotary valve 10. As shown from this perspective, the cross-sectional area of the lattice cell units 78a and 78b gradually increase in a direction perpendicular to the pivot axis X as the lattice cell units 78a and 78b extend toward a center portion of the control element 40. In other words, the lattice structure 56 forms a contour that is symmetrical about the pivot axis X, and reaches an outermost boundary (i.e. greatest distance from a surface of the base 42) where the joint 82a, 82b, 82c of each lattice cell unit 78a, 78b, 78c meets the brace 68.

Figure 7:
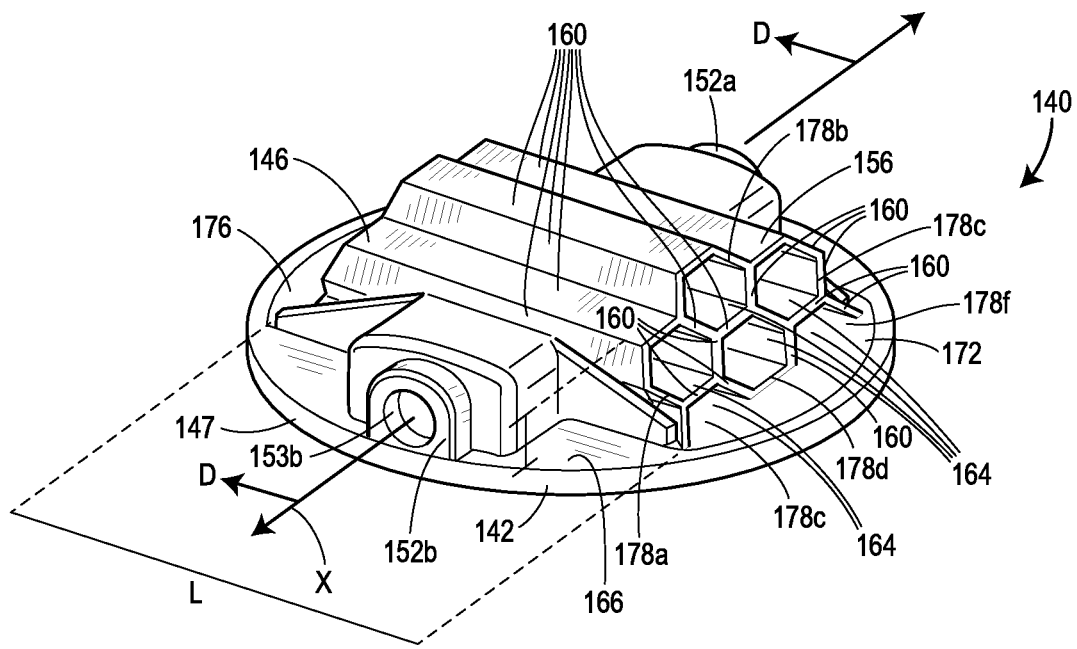
FIG. 7 is a perspective view of a control element constructed in accordance with the teachings of a second exemplary arrangement of the present disclosure.
Figure 8:
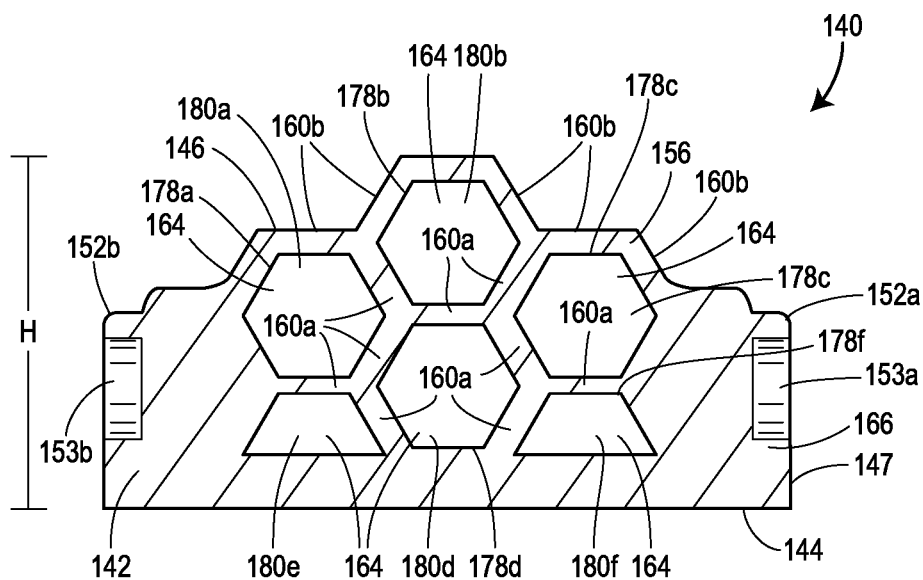
FIG. 8 is a cross-sectional view of the second exemplary control element of FIG. 7, the cross-section taken at D-D of FIG. 7.

In FIGS. 7 and 8, a second exemplary control element 140 is constructed in accordance with the teachings of the present disclosure. The second exemplary control element 140 is similar to the first exemplary control element 40 described above, except that the second exemplary control element 140 has a different lattice structure 156. Elements of the second exemplary control element 140 in FIGS. 7 and 8 which are similar to the elements of the first exemplary control element 40 are designated by the same reference numeral, incremented by 100. A description of many of these elements is abbreviated or even eliminated in the interest of brevity.

The lattice structure 156 of the control element 140 of FIGS. 7 and 8 includes four hexagonal lattice cell units 178a, 178b, 178c, 178d and two trapezoidal lattice cell units 178e, 178f. Each cell unit 178a, 178b, 178c, 178d, 178e, 178f is at least partially defined by a plurality of connected lattice members 160a, 160b, and the lattice members 160a, 160b at least partially define the central cavity 180a, 180b, 180c, 180d, 180e, 180f of each lattice cell unit 178a, 178b, 178c, 178d, 178e, 178f. The trapezoidal lattice cell units 178e, 178f and the enclosed hexagonal lattice cell unit 178d are adjacent to a downstream surface 166 of a base 142 of the control element 140, and thus are partially defined by the base 142. As such, the lattice structure 156 extends a height H from the downstream surface 166 of the base 142, and a length L across a back side 146 of the control element 140.

In contrast to the lattice structure 56 of the first exemplary control element 40, the lattice structure 156 of this example is entirely open or free-standing without a brace extending across the back side 146 of the control element 140. Additionally, the cross-sectional area of the lattice cell units 178a, 178b, 178c, 178d, 178e, 178f remains constant (i.e. the space provided by the inner cavities remain the same) as the lattice cell units 178a, 178b, 178c, 178d, 178e, 178f extend toward a pivot axis X of the control element 140 from either the leading or trailing portions 172, 174. Thus, a plurality of channels 164 formed in the back side 146 of the control element 140 at least partially extend between both the leading portion 172 and the trailing portion 176 of the control element 140. The channels 164 stop short of the edges of the leading portion 172 and trailing portion 176 of the control element 140. However, in other examples, one or more channels 164 may extend entirely across the back side 146 of the control element 140, or one or more channels 164 may extend only partially across one or both of the leading and trailing portions 172, 176. Moreover, any of the lattice structure configurations may be formed or attached to a front side 144 of the control element 140.

Figure 9:
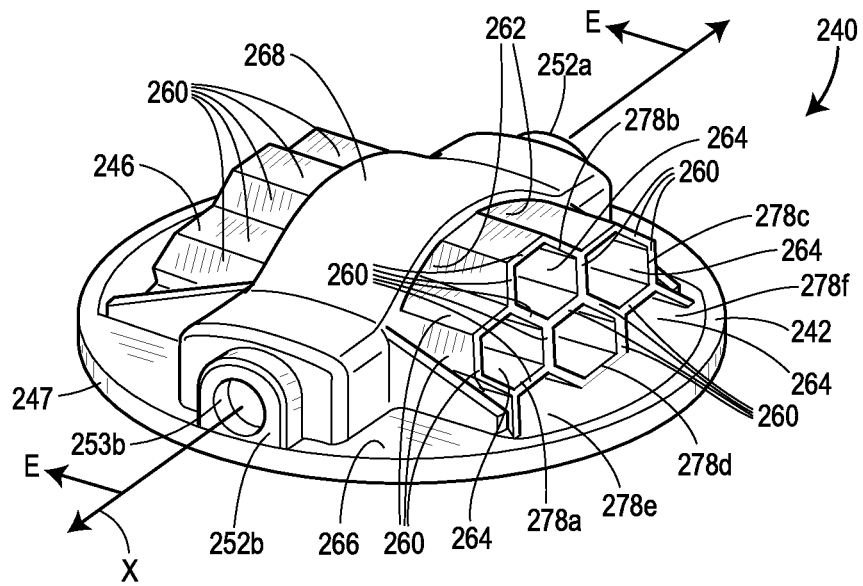
FIG. 9 is a rear, perspective view of a control element constructed in accordance with the teachings of a third exemplary arrangement of the present disclosure.
Figure 10:
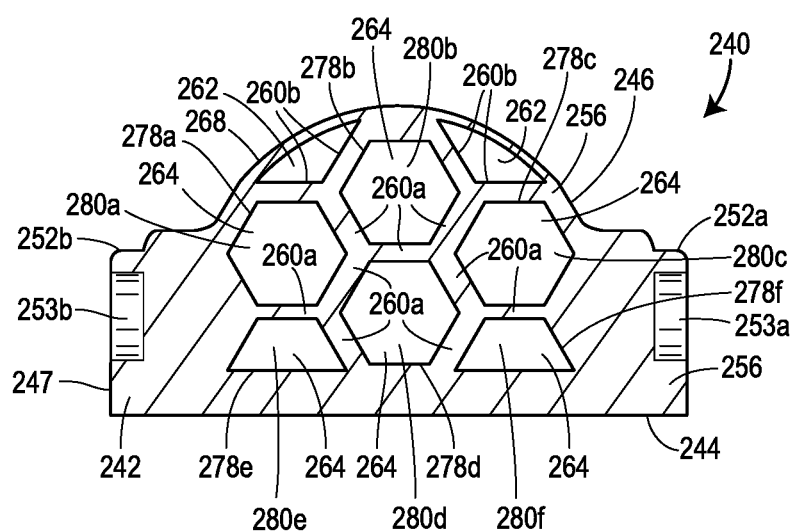
FIG. 10 is a cross-sectional view of the third exemplary control element of FIG. 9, the cross-section taken at E-E of FIG. 9.

In FIGS. 9 and 10, a third exemplary control element 240 is constructed in accordance with the teachings of the present disclosure. The third exemplary control element 240 is similar to the second exemplary control element 140 of FIGS. 7 and 8, except that the third exemplary control element 240 has a different lattice structure 256 including a support brace 268 extending across a back side 246 of the control element 240. The support brace 268 extends from first and second hubs 252a, 252b of the control element 240, and at least partially defines additional flow channels 262. The support brace 268 may be constructed similarly as the brace 68 of the first exemplary control element 40. Elements of the third exemplary control element 240 in FIGS. 9 and 10 which are similar to the secondary exemplary elements of the control element 140 are designated by the same reference numeral, incremented by 100.

Figure 11:
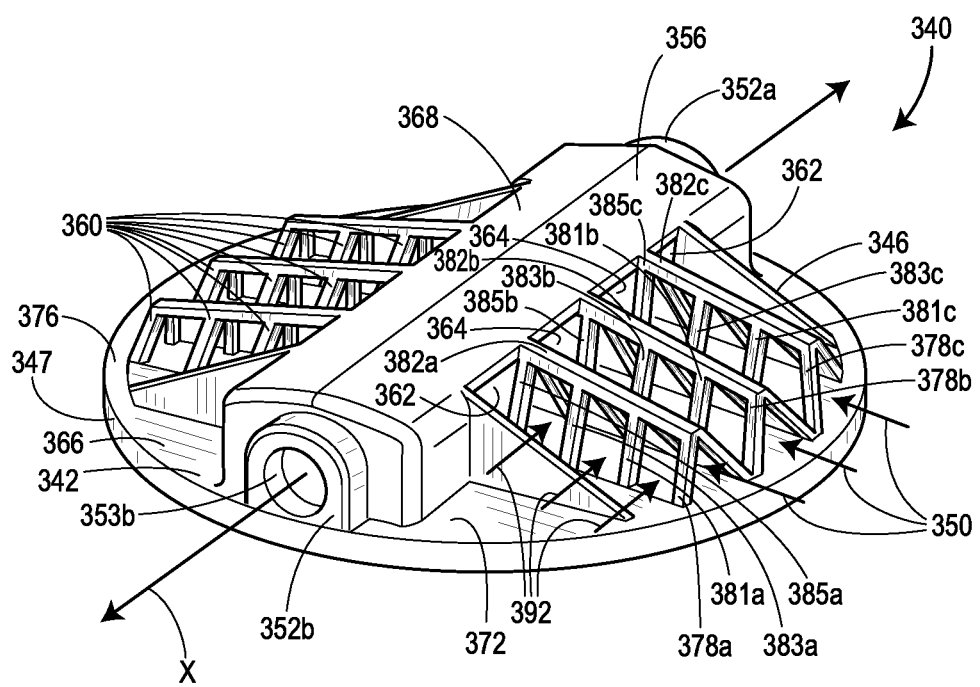
FIG. 11 is a rear, perspective view of a control element constructed in accordance with the teachings of a fourth exemplary arrangement of the present disclosure.

FIG. 11 illustrates a fourth exemplary control element 340 constructed in accordance with the teachings of the present disclosure. The fourth exemplary control element 340 is similar to the first exemplary control element 40 of FIGS. 1-6, except that the fourth exemplary control element 340 has a different lattice structure 356 that provides one or more channels 350, 392 extending in directions both perpendicular and parallel to a pivot axis X of the control element 340. The support brace 368 may be constructed similarly as the brace 68 of the first exemplary control element 40, and also extends between first and second hubs 352a, 352b of the control element 340. Elements of the fourth exemplary control element 340 in FIG. 11 which are similar to the elements of the first exemplary control element 40 are designated by the same reference numeral, incremented by 300. A description of many of these elements is abbreviated or even eliminated in the interest of brevity.

As shown in FIG. 11, the lattice structure 356 may be formed by a plurality of interconnecting and free-standing lattice cell units 378a-c, 381a-c, 383a-c, 385a-c composed of a plurality of connected lattice members 360. By comparison to the lattice 56 of the first exemplary control element 40, the lattice structure 356 has a different, three-dimensional triangulated structure. In this example, the lattice structure 356 includes more free-standing lattice cell units 378a-c, 381a-c, 383a-c, 385a-c that are spaced apart to form additional channels 392. The channels 350, 392 formed in the lattice structure 356 extend in both perpendicular and parallel directions relative to the pivot axis X. More specifically, a plurality of lattice cell units 378a-c, 381a-c, 383a-c, 385a-c are formed with, or connected to, a base 342 of the control element 340, and are interconnected by a plurality of lattice members 360. For example, the lattice members 360 are arranged to connect consecutive lattice cell units 378a-c, 381a-c, 383a-c, 385a-c, such as four consecutive triangular lattice cell units (e.g. 378a, 381a, 383a, 385a) in which each lattice cell unit 378a-c, 381a-c, 383a-c, 385a-c has a similar cross-sectional shape, but may have a different cross-sectional area. The consecutive lattice cell units (e.g. 378a, 381a, 383a, 385a) are connected by a sloping lattice member 360 that extends across each joint 381a, 381b, 381c of the lattice cell units 378a-c, 381a-c, 383a-c, 385a-c to connect the free-standing lattice cell units 378a-c, 381a-c, 383a-c, 385a-c to the brace 368. In this example, the lattice cell units 378a-c, 381a-c, 383a-c, 385a-c partially extend across the back side 346 of the valve 340.

Figure 12:
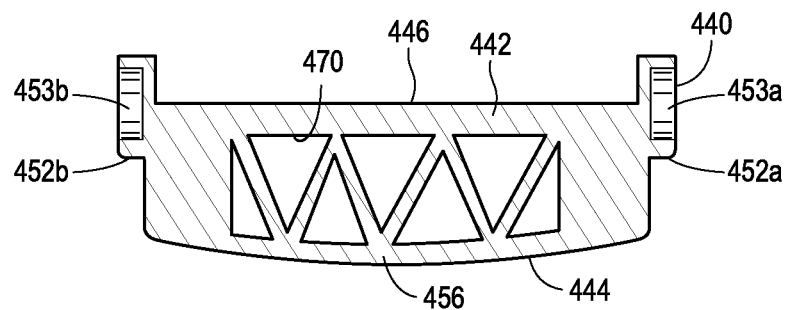
FIG. 12 is a cross-sectional side view of a control element constructed in accordance with the teachings of a fifth exemplary arrangement of the present disclosure.

In FIG. 12, a fifth exemplary control element 440 is constructed in accordance with the teachings of the present disclosure. The fifth exemplary control element 440 is similar to the first exemplary control element 40 of FIGS. 1-6 described above, except that the fifth control element 440 has a lattice structure 456 disposed (e.g. integrally formed or attached) on a front side 444 of the control element 440. The lattice structure 456 may be formed separately and then attached to an upstream surface 470 of a base 442, or the lattice structure 456 may be integrally formed with the base 442 of the control element 440. Elements of the control element 440 in FIG. 12 which are similar to the elements of the control element 40 are designated by the same reference numeral, incremented by 400.

Figure 13:
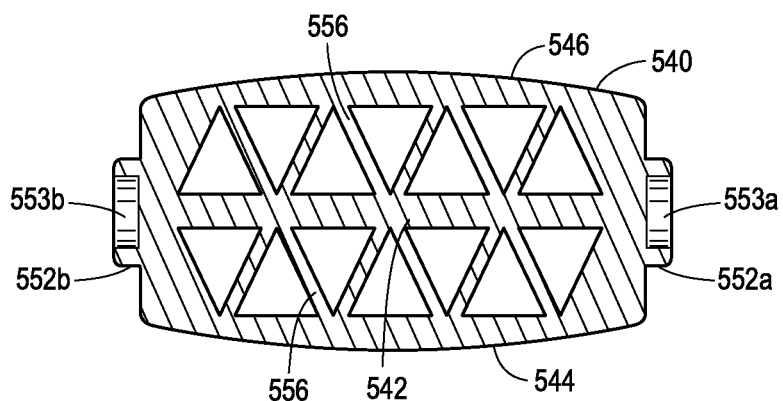
FIG. 13 is a cross-sectional side view of a control element constructed in accordance with the teachings of a sixth exemplary arrangement of the present disclosure.

In FIG. 13, a sixth exemplary control element 540 is constructed in accordance with the teachings of the present disclosure. The sixth exemplary control element 540 is similar to the first exemplary control element 40 of FIGS. 1-6 described above, except that the sixth control element 540 has a lattice structure 556 disposed (e.g. integrally formed or attached) on a front side 544 and a back side 546 of the control element 540. The lattice structure 556 may be formed separately, or the lattice structure 556 may be integrally formed with the base 542 of the control element 540. Elements of the control element 540 in FIG. 13 which are similar to the elements of the control element 40 are designated by the same reference numeral, incremented by 500. It will be appreciated that the control element 540 may be a valve disk for a butterfly valve, a ball closure member with a spherical or elliptical shape formed by the lattice structure 556 for a ball valve, or other closure member for a rotary valve.

Figure 14:
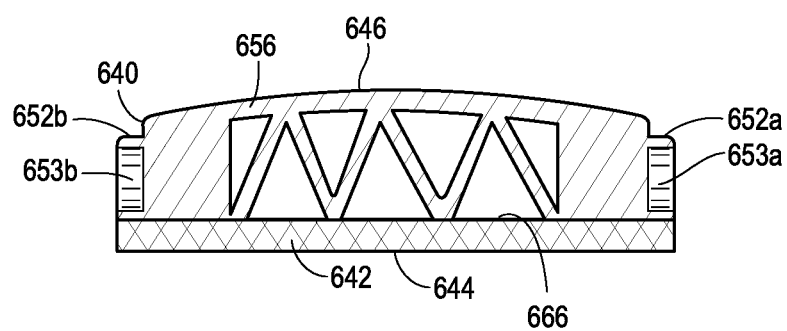
FIG. 14 is a cross-sectional side view of a control element constructed in accordance with the teachings of a seventh exemplary arrangement of the present disclosure.

In FIG. 14, a seventh exemplary control element 640 is constructed in accordance with the teachings of the present disclosure. The seventh exemplary control element 640 is similar to the first exemplary control element 40 of FIGS. 1-6 described above, except that the seventh control element 640 has a lattice structure 656 of a first material that is attached to a downstream surface 666 of a base 642 having a second material. In another example, the base 642 and the lattice structure 656 may be the same material but the lattice structure 656 has a first density and the base 642 has a second density. Elements of the control element 640 in FIG. 14 which are similar to the elements of the control element 40 are designated by the same reference numeral, incremented by 600.

Figure 15:
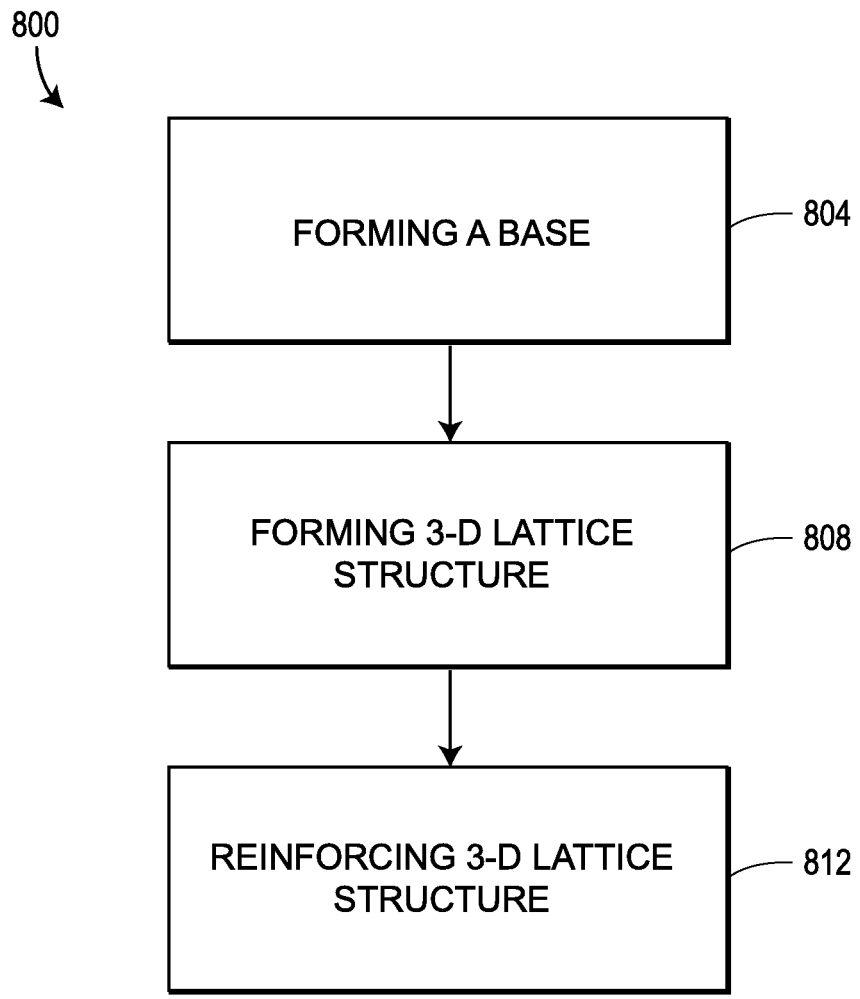
FIG. 15 is a diagram of an example process or method of manufacturing a control element according to the teachings of the present disclosure.

A flow chart 800 in FIG. 15 is representative of an example method of manufacturing a control element of a rotary valve using AM techniques according to the teachings of the present disclosure. The example method 800 shown in FIG. 15 is a method or process of custom manufacturing a control element, such as the first exemplary control element 40 of FIGS. 1-6, the second exemplary control element 140 of FIGS. 7 and 8, the third exemplary control element 240 of FIGS. 9 and 10, the fourth exemplary control element 340 of FIG. 11, the fifth exemplary control element 440 of FIG. 12, the sixth exemplary control element 540 of FIG. 13, and the seventh exemplary control element 640 of FIG. 14. A control element, such as a valve disk, manufactured according to the method or process 800 has a reduced weight and an increased flow capacity by comparison to a conventional butterfly valve disk. The control element 40 of FIGS. 1-6 will be used in the following description of the method or process 800 to help illustrate each of the method steps. However, it will be appreciated that the method or process 800 is not limited to forming the first exemplary control element 40, and may be used to manufacture any of the illustrated examples described herein.

The method includes the act 800 of creating a customized control element using an AM technique or process that builds three-dimensional objects by adding successive layers of material on a material or receiving surface. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, a multi-jet modeling ("MJM") process, a selective laser sintering ("SLS") process, a selective laser melting ("SLM") process, an electronic beam melting ("EBM") process, and an arc welding AM process. In some embodiments, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a control element according to the present disclosure, and are not limited to the techniques herein. Additionally, the example method 800 may be performed using other manufacturing processes and techniques outside of the AM technical field, such as, for example, investment casting.

Using AM techniques, the control element 40 may be customizable to achieve certain flow characteristics, strength properties, or other desired traits to improve performance of a butterfly valve 10. The method 800 may include performing a finite element analysis ("FEA") to determine which areas of the control element 40 that may be customized using AM. For example, the lattice structure 56 may be constructed to provide a linear flow design to achieve more precise throttling control. The lattice structure 56 may also be designed to achieve a non-linear flow characteristic. Additionally, the cross-sectional shape of the lattice cell units 78a, 78b, 78c and the number of channels 50 formed in the lattice structure 56 may be customized to reduce noise within the valve 10. Further, the lattice cell units 78a, 78b, 78c may be designed to better transfer load and other forces imparted on the control element 40 to increase the strength of the control element 40. In yet another example, the lattice structure 56 may be completely encapsulated such that the channels 50, 62, 64 formed in the lattice structure 56 do not fluidly connect the inlet 18 and the outlet 22 of the valve 10. In this case, the lattice structure 56 achieves a desired weight and strength of the control element 40 to reduce disk flexing.

The method 800 includes an act 804 of forming a base 42 having a downstream or first surface 66 and an upstream or second surface 70. Forming the base 42 may include forming the base 42 separately from fabrication of other components of the control element 40 either by AM techniques or other known methods. Alternatively, the act 804 may include integrally forming the base 42 with the other components of the control element 40. For example, the step 804 of forming the base 42 may include forming the first and second hubs 52a, 52b by forming a bore 53a aligned with a longitudinal axis Y to receive a valve shaft 30 and a second bore 53b to receive a follower shaft 54. In another example, the first and second hubs 52a, 52b may be formed separately from the base 42 and subsequently attached. In yet another example, the shaft 30 and the follower shaft 54 may be operatively coupled to the control element 40 by another suitable coupling device or technique (e.g. fasteners, pins, adhesive, welding, etc.).

The method or process 800 further includes an act 808 of forming a three-dimensional lattice structure 56 by depositing solidifiable material onto the base 42, or a receiving layer. The lattice structure 56 may be formed by connecting a plurality of connected lattice members 60 that defines one or more channels 50, 62, 64 extending across the base 42 of the control element 40. Forming a three-dimensional structure 808 includes depositing solidifiable material directly onto a receiving layer, depositing solidifiable material directly onto a downstream surface 66 of the base 42, depositing solidifiable material directly onto an upstream surface 70 of the base 42, or depositing solidifiable material on both the downstream and upstream surfaces 66, 70 of the base 42. Forming the three-dimensional lattice structure 808 may include connecting a plurality of lattice members 60 to form individual, free-standing lattice cell units 78a, 78b, 78c, and/or connected lattice cell units 78a, 78b, 78c. For example, forming the one or more lattice cell units 78a, 78b, 78c of the control element 40 of FIGS. 1-6 includes depositing the solidifiable material in layers to form a triangular cross-sectional shape for each lattice cell unit 78a, 78b, 78c, where each cross-sectional shape is formed relative to a pivot axis X of the control element 40. Each of the lattice cell units 78a, 78b, 78c may be formed by depositing solidifiable material to form one lattice cell unit 78a, 78b, 78c at a time, or the lattice cell units 78a, 78b, 78c may be gradually formed across the base 42 in consecutive layers. Further, the method may include a step 812 of reinforcing the lattice structure 56 by adding a lattice brace 68 that further defines additional channels 62, 64 in the three-dimensional lattice structure 56 and may provide additional structural support to increase strength and rigidity to the control element 40. It will be appreciated that the act 808 may form any round or polygonal cross-sectional shape and may be performed multiple times depending on the complexity of the lattice structure 56 and the desired thickness of the base 42.

The act 804 of forming the base 42 may be combined with the act 808 of forming the lattice structure 56. The combination of these steps 804, 808 includes depositing a solidifiable material in multiple layers to create a three-dimensional control element body 40 with a lattice structure 56. In this example, the base 42 and the lattice structure 56 may be designed together as a three-dimensional model and then manufactured as a single body by AM.

The method 800 may be customized to create a control element 40 with a lattice structure 56 having different sizes and/or shapes in cross-section, and/or arranged in different patterns or arrays. Generally speaking, each of the one or more channels 50, 62, 64 will have a cross-sectional shape that is not limited to being triangular. As examples, FIGS. 1-6 illustrate channels 50, 62, 64 having a triangular cross-sectional shape and FIGS. 7 and 8 illustrate channels 164 having hexagonal and trapezoidal cross-sectional shapes. Other cross-sectional shapes are possible as well, such as polygonal, round, and irregular cross-sectional shapes. It will also be appreciated that one or more of the channels may have a different shape and/or size than one or more other channels. As illustrated in FIG. 11, for example, the channels have triangular shapes in cross-section, but the lattice cell units 78a, 78b, 78c vary in cross-sectional area.

Further, the step of depositing solidifiable material of the method or process 800 of FIG. 15 may be customized to manufacture and design a lattice structure 56 for a particular application, such as, for example, providing a lattice structure 56 that best distributes force and to withstand highly pressurized fluid flow through the valve 10. For example, the lattice structure 56 may provide strength where needed by decreasing the distance between lattice members 60 (i.e. increasing lattice density) and may reduce weight where strength is not needed by increasing the distance between lattice members 60 (i.e. decreasing lattice density). In another example, the lattice structure 56 may be designed to influence or shape the flow of fluid through the rotary valve 10. Through AM techniques, one or more channels 50, 62, 64 may be customized to define a unique and complex flow path to achieve certain desirable flow characteristics. For example, the flow path provided by the one or more channels 50, 62, 64 of the lattice structure 56 may impact the shape of the flow to achieve a desired flow profile. This may be achieved if the one or more channels 50, 62, 64 receives fluid at the leading portion 72 and shapes, diffuses, or directs fluid to flow across the control element 40 in a particular way. Additionally, the lattice structure 56 may be designed to shape fluid flowing through the valve 10 when the control element 40 rotates to different intermediate positions between the fully open position and the fully closed position.

The control element body 40 may be made of one or more suitable materials, such as, for example, steel, stainless steel, aluminum, various alloys (e.g., high nickel alloys), plastics, resins, and by virtue of being customizable, can be any number of different shapes and/or sizes. The entire lattice structure 56 may be made of one or more materials (e.g. the control element 640 of FIG. 14), and the structure 56 may be uniform or non-uniform, with specific densities at a predetermined localized areas of the control element 40. In some examples, the lattice cell units 78a, 78b, 78c may vary in density, forming a lattice structure 56 having a non-uniform density. The density of the lattice structure 56 may change by varying a distance between connected lattice members 60.

In accordance with one or more exemplary aspects of the present disclosure, a rotary valve incorporating one of the control elements 40, 140, 240, 340, 440, 540, 640 of FIGS. 1-14 may address the limitations of current manufacturing processes placed on manufacturing and assembling rotary valves and/or rotary control elements. A rotary valve, such as the rotary valve 10 of FIG. 1 or other high-performance butterfly valve, such as, for example, the Fisher™ 8590 valve, Fisher™ 8560 valve, and the Fisher™ 8580, may incorporate one of the exemplary control elements 40, 140, 240, 340, 440, 540, 640 or a control element manufactured according to the method or process 800 disclosed herein. The exemplary control elements 40, 140, 240, 340, 440, 540, 640 may be designed to characterize fluid flowing through a rotary valve 10, and to reduce overall weight of the control element 40, 140, 240, 340, 440, 540, 640 without compromising strength and integrity of the control element 40, 140, 240, 340, 440, 540, 640. A conventional control element is typically limited in design choice due to the limitations in manufacturing, and requirements for the control element. For example, a certain strength of the control element is needed to prevent disk flexing when the control element is exposed to high fluid pressure forces. AM techniques affords a designer of the control element 40, 140, 240, 340, 440, 540, 640 with the flexibility in designing a strong control element 40, 140, 240, 340, 440, 540, 640 capable of withstanding internal forces within a valve 10 and having a reduced weight. For example, a control element 40, 140, 240, 340, 440, 540, 640 constructed according to the present disclosure may weigh 25% to 45% less than a conventional control element without compromising integrity or strength of the control element 40, 140, 240, 340, 440, 540, 640. As illustrated and described herein, each of the exemplary control elements 40, 140, 240, 340, 440, 540, 640 includes a lattice structure 56, 156, 256, 356, 456, 556, 656, which reduces weight of the control element 40, 140, 240, 340, 440, 540, 640. A reduction in weight of the control element 40, 140, 240, 340, 440, 540, 640 reduces material costs associated with manufacturing the valve 10, and also reduces costs associated with assembling and performing maintenance on the rotary valve 10. For example, for large scale process systems, lifting machinery may be required to lift a heavy control element and position the control element within the valve. The costs associated with renting lifting machinery can vary considerably between lifting machines designed to lift different weights, where renting machinery with higher lifting capabilities (i.e. higher rated lifting devices) are more expensive. Thus, a reduction in weight of the control element 40, 140, 240, 340, 440, 540, 640 reduces the overall weight of the valve 10, and thus reduces costs of assembly and maintenance of the rotary valve 10. The lattice structure 56, 156, 256, 356, 456, 556, 656 may attenuate noise through the valve 10 because the plurality of channels formed by the lattice structure 56, 156, 256, 356, 456, 556, 656 are configured to separate inlet fluid flow into multiple, smaller jets, which helps to reduce flow turbulence.

Additionally, the skilled person would understand that AM may utilize any number three-dimensional printers or AM machines that are available and that are suitable for making and designing a rotary valve or control element in accordance with the present disclosure. AM enables a design-driven manufacturing process such that the body components of fluid control systems are manufactured based on the design requirements, and not based on the restriction and limited capabilities of manufacturing methods. AM affords design flexibility, integration of new materials and structures, and customization of body components. Additive manufacturing may be used for designing light, stable, customizable and complex structures, thereby saving a manufacturer costs related to labor and materials associated with finishing processes. Additive manufacturing allows each control element to be customized according to the requirements of the process for which it is used.

The figures and description provided herein depict and describe preferred examples of a rotary valve and a control element for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for control elements for a rotary valve. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A rotary valve comprising:
   a valve body defining an inlet, an outlet, and a fluid flow path connecting the inlet and the outlet;
   a valve shaft disposed in the valve body;
   a control element including an upstream side, a downstream side, and a base, the base including an upstream surface and a downstream surface, the control element including a pivot axis and being operatively connected to the valve shaft and disposed in the fluid flow path, the control element rotatable by the valve shaft about the pivot axis between an open position, in which the control element permits fluid flow between the inlet and the outlet, and a closed position, in which the control element limits flow between the inlet and the outlet;
   the control element including an inlet edge and an outlet edge symmetrically disposed about the pivot axis, the control element including a diameter extending from the inlet edge to the outlet edge;
   wherein a portion of the control element includes a lattice structure including a plurality of connected lattice members extending away from the downstream surface of the base to form at least a portion of an outermost contour of the downstream side of the control element, the lattice structure defining one or more channels extending across the downstream side of the control element; and
   wherein at least two of the plurality of connected lattice members extend from the inlet edge towards the pivot axis, the at least two connected lattice members angled inwardly relative to each other to form a joint at the inlet edge;
   wherein the joint extends from the inlet edge and couples directly to a brace, the brace at least partially extending parallel relative to the pivot axis.

2. The rotary valve of claim 1, wherein the one or more channels of the control element defines a secondary flow path connecting the inlet and the outlet when the control element is in the open position.

3. The rotary valve of claim 1, wherein the lattice structure includes one or more lattice cell units, at least one lattice cell unit including a central cavity at least partially defining one channel of the one or more channels.

4. The rotary valve of claim 3, wherein the at least one lattice cell unit of the one or more lattice cell units has a polygonal cross-sectional shape.

5. The rotary valve of claim 4, wherein the one or more lattice cell units at least partially extends across the first side of the control element along the diameter, the diameter extending in a direction perpendicular to the pivot axis of the control element.

6. The rotary valve of claim 3, wherein the brace is a lattice brace connecting a first lattice cell unit to a second lattice cell unit of the one or more lattice cell units, the lattice brace enclosing a portion of the lattice structure.

7. The rotary valve of claim 1, wherein the first side is one of a downstream side and an upstream side of the control element.

8. The rotary valve of claim 1, wherein the lattice structure is integrally formed with the base of the control element.

9. The rotary valve of claim 1, wherein the outermost contour of the downstream side of the control element is symmetrical relative to the pivot axis, and wherein an upper joint of the lattice structure is spaced a first distance from the downstream surface of the base adjacent the inlet edge of the control element and is spaced a second and greater distance from the downstream surface of the base adjacent the brace.

10. The rotary control valve of claim 9, wherein the outermost contour of the downstream side of the control element is defined in part by the joint formed by the two connected lattice members.

11. A control element for controlling fluid flow through a rotary valve, the control element comprising:
a body having an upstream side, a downstream side opposite the upstream side, and a pivot axis;
the upstream side of the body including an inlet edge, an outlet edge symmetrically disposed about the pivot axis, and a diameter extending from the inlet edge to the outlet edge; and
a lattice structure including a plurality of lattice members, the lattice structure defining one or more channels extending across the body at an angle relative to the pivot axis of the body;
wherein the lattice structure is disposed on the downstream side of the body;
wherein at least two of the plurality of lattice members are connected from the inlet edge towards the pivot axis along the diameter; and
wherein the at least two lattice members are angled inwardly toward each other to form a joint, the joint extending in an upwardly sloping fashion from the inlet edge towards the pivot axis to directly couple to a brace extending at least partially parallel relative to the pivot axis, an upper extent of the joint forming an outermost contour of the downstream side of the body;
wherein the diameter is perpendicular relative to the pivot axis and parallel to the body; and
wherein the joint extends perpendicular to the brace.

12. The control element of claim 11, wherein the lattice structure includes a plurality of lattice cell units, at least one lattice cell unit includes a central cavity at least partially defining one channel of the one or more channels.

13. The control element of claim 12, wherein the at least one lattice cell unit has a cross-sectional shape defined by two or more lattice members, the two or more lattice members connected to form the cross-sectional shape.

14. The control element of claim 12, wherein the brace joins at least two lattice cell units of the plurality of lattice cell units, the brace at least partially defining one channel of the one or more channels.

15. The control element of claim 11, wherein the body includes a first portion of a first density and a second portion of a second density, the first density greater than the second density.

16. A rotary valve comprising:
a valve body defining an inlet, an outlet, and a fluid flow path connecting the inlet and the outlet;
a valve shaft disposed in the valve body;
a control element including a first side, a second side, a base connecting the first side and the second side, and a pivot axis, the control element operatively connected to the valve shaft and disposed in the fluid flow path, the control element rotatable by the valve shaft about the pivot axis between an open position, in which the control element permits fluid flow between the inlet and the outlet, and a closed position, in which the control element limits flow between the inlet and the outlet;
the control element including an inlet edge and an outlet edge symmetrically disposed about the pivot axis, the control element including a diameter extending from the inlet edge to the outlet edge;
wherein a portion of the control element includes a lattice structure including a plurality of connected lattice members extending from a surface of the base away from the second side, the lattice structure defining one or more channels extending across the first side of the control element; and
wherein at least two of the plurality of connected lattice members extend from the inlet edge towards the pivot axis, the at least two connected lattice members angled inwardly relative to each other to form a joint at the inlet edge;
wherein the joint extends from the inlet edge and couples directly to a brace, the brace at least partially extending parallel relative to the pivot axis; and
further comprising one or more channels extending across the second side of the control element.

17. A control element for controlling fluid flow through a rotary valve, the control element comprising:
a body having a first side, a second side opposite the first side, and a pivot axis;
the first side of the body including an inlet edge, an outlet edge symmetrically disposed about the pivot axis, and a diameter extending from the inlet edge to the outlet edge; and
a lattice structure including a plurality of lattice members, the lattice structure defining one or more channels extending across the body at an angle relative to the pivot axis of the body;
wherein the lattice structure is disposed on the first side of the body;
wherein at least two of the plurality of lattice members are connected and extend from the inlet edge towards the pivot axis along the diameter; and
wherein the at least two lattice members are angled inwardly toward each other to form a joint, the joint extending from the inlet edge to directly couple to a brace extending at least partially parallel relative to the pivot axis;
wherein the diameter is perpendicular relative to the pivot axis and parallel to the body; and wherein a first cross-sectional area of a first channel of the one or more channels is different than a second cross-sectional area of the first channel.

\* \* \* \* \*

UNITED STATES PATENT AND TRADEMARK OFFICE
CERTIFICATE OF CORRECTION

| | | |
|---|---|---|
| PATENT NO. | : 11,448,323 B2 | Page 1 of 1 |
| APPLICATION NO. | : 15/967339 | |
| DATED | : September 20, 2022 | |
| INVENTOR(S) | : Timothy A. McMahon | |

It is certified that error appears in the above-identified patent and that said Letters Patent is hereby corrected as shown below:

In the Specification

At Column 2, Lines 33-34, "attachable a" should be -- attachable to a --.

At Column 10, Lines 50-51, "electronic beam melting ("EBM")" should be -- electron beam melting ("EBM") --.

At Column 10, Line 55, "computer-numerically-controlled ("CNC")" should be -- computer numerical control ("CNC") --.

In the Claims

At Column 15, Line 31, "The rotary control valve of claim" should be -- The rotary valve of claim --.

Signed and Sealed this
Thirty-first Day of October, 2023

Katherine Kelly Vidal
*Director of the United States Patent and Trademark Office*